(12) United States Patent
Sirianni

(10) Patent No.: US 12,088,069 B2
(45) Date of Patent: Sep. 10, 2024

(54) EXTENDABLE ELECTRICAL BOX SYSTEM

(71) Applicant: Valentino Sirianni, Woodbridge (CA)

(72) Inventor: Valentino Sirianni, Woodbridge (CA)

( * ) Notice: Subject to any disclaimer, the term of this patent is extended or adjusted under 35 U.S.C. 154(b) by 290 days.

(21) Appl. No.: 17/651,528

(22) Filed: Feb. 17, 2022

(65) Prior Publication Data

US 2022/0263296 A1    Aug. 18, 2022

Related U.S. Application Data

(60) Provisional application No. 63/150,843, filed on Feb. 18, 2021.

(51) Int. Cl.
*H02B 1/40* (2006.01)

(52) U.S. Cl.
CPC ..................................... *H02B 1/40* (2013.01)

(58) Field of Classification Search
None
See application file for complete search history.

(56) References Cited

U.S. PATENT DOCUMENTS

| | | | | |
|---|---|---|---|---|
| 3,433,886 A * | 3/1969 | Myers | ..................... | H02G 3/185 220/3.7 |
| 3,573,344 A * | 4/1971 | Snyder | ................... | H02G 3/086 220/8 |
| 4,163,882 A * | 8/1979 | Baslow | .................. | H02B 1/044 174/57 |
| 5,023,396 A * | 6/1991 | Bartee | .................... | H02G 3/185 439/131 |
| 5,042,673 A * | 8/1991 | McShane | ................ | H02G 3/121 220/3.7 |
| 5,193,664 A * | 3/1993 | Ives | ........................ | H01H 27/06 200/43.11 |
| 5,596,174 A * | 1/1997 | Sapienza | ................ | H02G 3/086 174/53 |
| 5,934,917 A * | 8/1999 | Haut | ...................... | H01R 24/76 439/131 |
| 6,091,023 A * | 7/2000 | O'Donnell | ............. | H02G 3/086 174/57 |
| 6,116,447 A | 9/2000 | Daoud | | |
| 6,812,405 B1 * | 11/2004 | Hull | ....................... | H02G 3/126 174/53 |
| 6,820,760 B2 * | 11/2004 | Wegner | ..................... | H02G 3/12 220/4.03 |
| 7,396,996 B1 * | 7/2008 | Shotey | ..................... | H02G 3/14 174/67 |
| 7,549,549 B1 * | 6/2009 | Kiely | ..................... | H02G 3/126 220/3.7 |
| 2016/0172831 A1 * | 6/2016 | Korcz | .................... | H02G 3/185 174/57 |

FOREIGN PATENT DOCUMENTS

| | | | |
|---|---|---|---|
| EP | 3528354 A1 | 8/2019 | |
| EP | 3654472 A1 | 5/2020 | |

\* cited by examiner

*Primary Examiner* — Krystal Robinson

(57) ABSTRACT

An extendable electrical box system includes an electrical box being portioned into a first section and a second section, whereby the first section and the second section are movable relative to each other to selectively move the electrical box from a retracted position to an extended position. In the retracted position, the electrical box may be sized to receive at least one electrical component, such as an outlet receptacle or a light switch. In the extended position, the electrical box may be sized to receive more than one electrical component.

4 Claims, 12 Drawing Sheets

EXTENDABLE ELECTRICAL BOX SYSTEM

CROSS-REFERENCE TO RELATED APPLICATION

This application claims the benefit of priority to a U.S. provisional application No. 63/150,843 filed on Feb. 18, 2021, which is herein incorporated by reference in its entirety.

FIELD OF THE INVENTION

The present invention relates generally to the field of electrical boxes and more specifically relates to an extendable electrical box.

DESCRIPTION OF THE RELATED ART

Electrical boxes provide a housing for electrical components such as outlets and switches when installed in the walls, ceilings, or floors of buildings. Electrical boxes are sold in standard sizes depending on the number of electrical components being housed therein. For example, electrical boxes made to house one light switch include a standard size that will fit only one light switch therein.

Due to this, if the building owner wishes to add another electrical component, the electrical box must be taken apart from a side wall, and additional boxes must be added to the existing electrical box to make it larger. As such, adding another electrical component is time consuming and costly as it can require professional electrician services, can cause extensive wall damage, and often results in waste, etc. Thus, a need exists for a reliable extendable electrical box system to avoid the above-mentioned problems.

SUMMARY OF THE INVENTION

The present invention advantageously fills the aforementioned deficiencies by providing an extendable electrical box system configured for extending the size of an electrical box. The present invention is superior to other systems in that it effectively provides a quick and easy way to add an electrical component to the electrical box when already installed in a wall.

The extendable electrical box system may include an electrical box configured for installation into a wall of a building and configured to receive electrical wires therethrough. The electrical box may include a housing having a rear wall, a left-side wall, a right-side wall, a top-side wall and a bottom-side wall, all defining an enclosure. The housing may be portioned into a first section and a second section whereby the first section includes the left-side wall, a first portion of the top-side wall, a first portion of the bottom-side wall and a first portion of the rear wall, the second section including the right-side wall, a second portion of a top-side wall, a second portion of the bottom-side wall, and a second portion of the rear wall.

The first section and the second section may be movable relative to each other to selectively move the electrical box from a retracted position to an extended position (smaller to larger inner volume). In the retracted position, the enclosure may be sized to receive at least one electrical component, and in the extended position, the enclosure may be sized to receive more than one electrical component.

In use, a user may install the electrical box into the wall of the building and thread/feed the electrical wires therethrough for later connection to at least one electrical component. The user may keep the electrical box in the retracted position and install at least one electrical component therein, connecting the electrical wires thereto. If the user then wants to add another electrical component, they may easily move the electrical box to the extended position and install another electrical component into the enclosure.

If the user decides to add an electrical component after installation of the first (or first and second) electrical components (whereby the wall is refinished), the user may simply remove a cover plate, easily cut the dry wall immediately adject to the electrical box, move the electrical box into the extended position, install the second (or third, fourth, etc.) electrical component and re-install the cover plate (preferably a new cover plate that covers all electrical components). Therefore, adding an electrical component to the electrical box is a quick and relatively easy process with minimal damage to the wall.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The figures which accompany the written portion of this specification illustrate embodiments and method(s) of use for the present invention, extendable electrical box, constructed and operative according to the teachings of the present invention.

The various embodiments of the present invention will hereinafter be described in conjunction with the appended drawings, wherein like designations denote like elements.

DETAILED DESCRIPTION

The present invention is directed to an extendable electrical box system. The extendable electrical box system may be configured to extend the sum (available inner volume) of an electrical box to provide a quick and easy way to add an electrical component to the electrical box when already installed in a wall. In one embodiment of the present invention, the extendable electrical box system may comprise an electrical box configured for installation into a wall of a building and configured to thread-ably (or otherwise) receive electrical wires therethrough.

Figure 1:
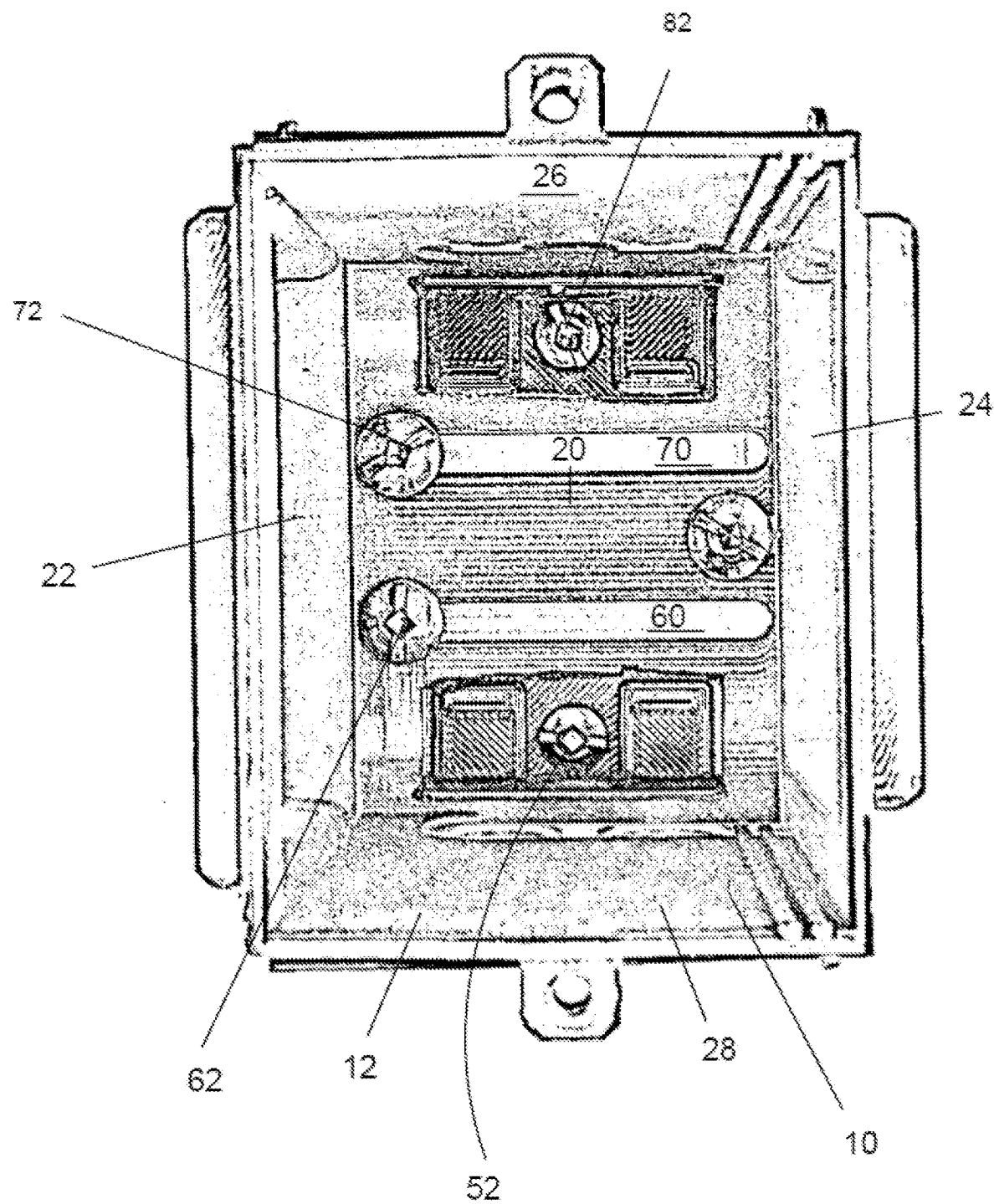
FIG. 1 is a front view of an extendable electrical box system, illustrating a retracted position thereof whereby an electrical box houses one electrical component, according to an embodiment of the present invention.
Figure 2:
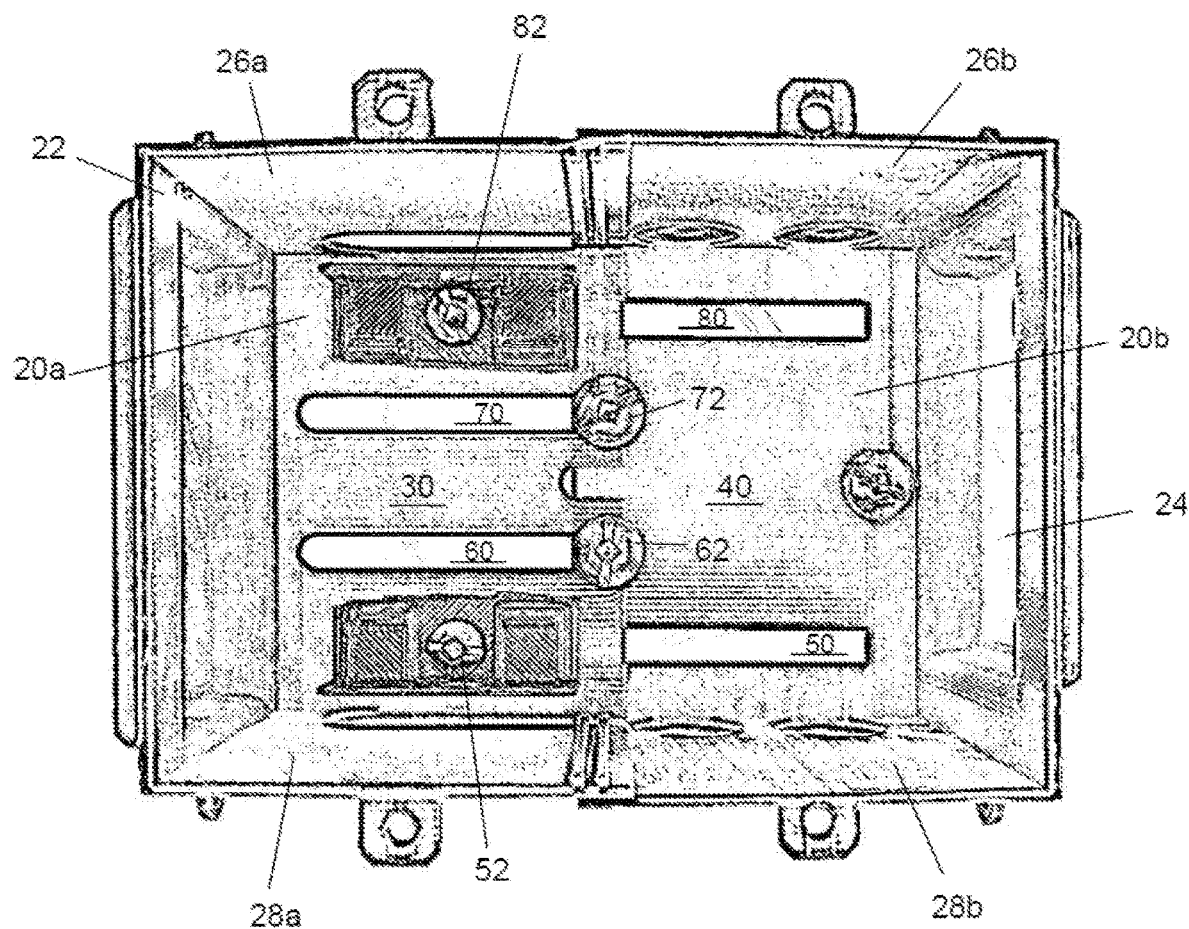
FIG. 2 is a front view of the extendable electrical box system of FIG. 1, illustrating an extended position thereof whereby the electrical box houses two electrical components, according to an embodiment of the present invention.
Figure 3:
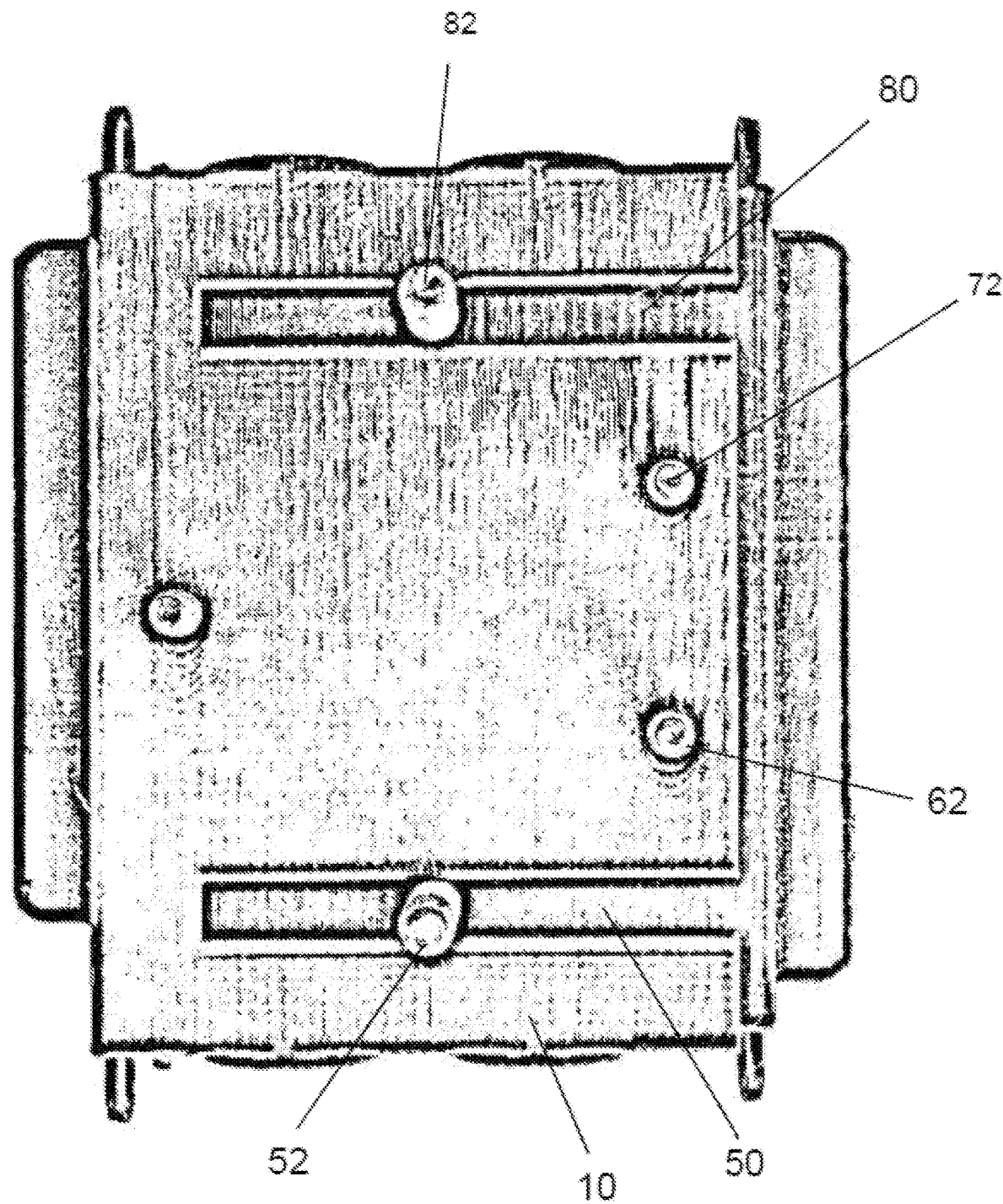
FIG. 3 is a rear view of the extendable electrical box system of FIG. 1

Referring now to the drawings, there is shown in FIGS. 1-3 an extendable electrical box system. As shown in FIG. 1, the electrical box 10 may include a housing 12 having a rear wall 20, a left-side wall 22, a right-side wall 24, a top-side wall 26 and a bottom-side wall 28 all defining an enclosure. In some embodiments, the housing 12 may be made of a metal material such as aluminum, steel, iron, or the like. In other embodiments, the housing may be made of a plastic material such as polyvinyl chloride. However, it should be appreciated that these materials are given as examples and the housing is not limited to the metal materials or plastic materials.

As shown in FIG. 2, the housing may be portioned into a first section 30 and a second section 40 whereby the first section 30 includes the left-side wall 22, a first portion of the top-side wall 26a, a first portion of the bottom-side wall 28a and a first portion of the rear wall 20a, the second section including the right-side wall 24, a second portion of the top-side wall 26, a second portion of the bottom-side wall 28, and a second portion of the rear wall 20b. The first section 30 and the second section 40 may be movable relative to each other to selectively move (slide) the electrical box 10 from a retracted position as shown in FIG. 1 to an extended position as shown in FIG. 2. In the retracted position, the enclosure may be sized to receive at least one electrical component, and in the extended position, the enclosure may be sized to receive more than one electrical component. For example, in one embodiment, the electrical box 10 may be configured to receive one electrical component in the retracted position (FIG. 1), and two electrical components in the extended position (FIG. 2).

Figure 10A:
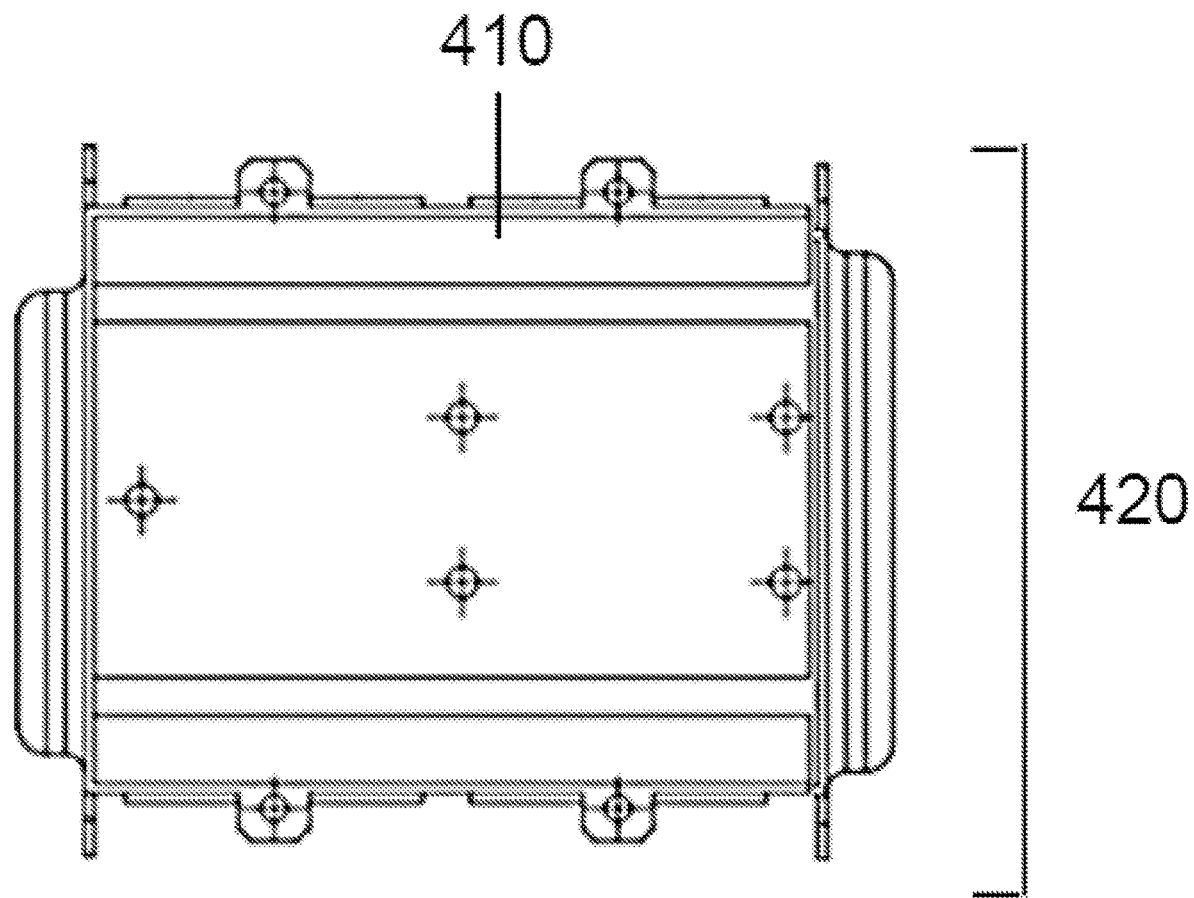
FIGS. 10A-10C are diagrams of another extendable electrical box, illustrating the retracted position, the semi-extended position and the fully extended position, according to an embodiment of the present invention.
Figure 10B:
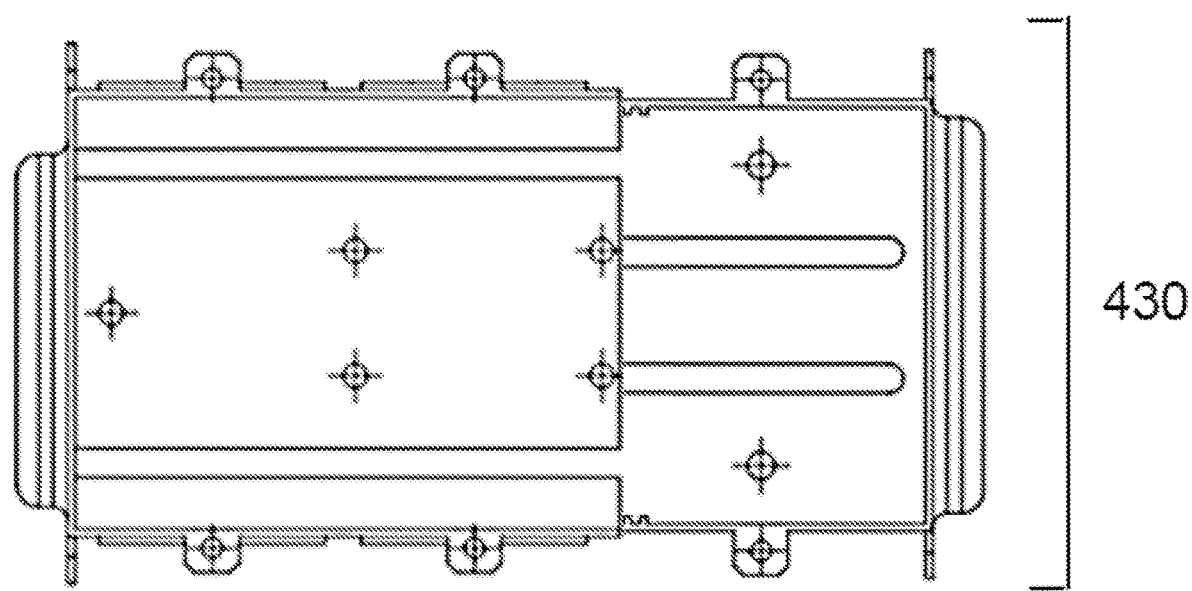
Figure 10C:
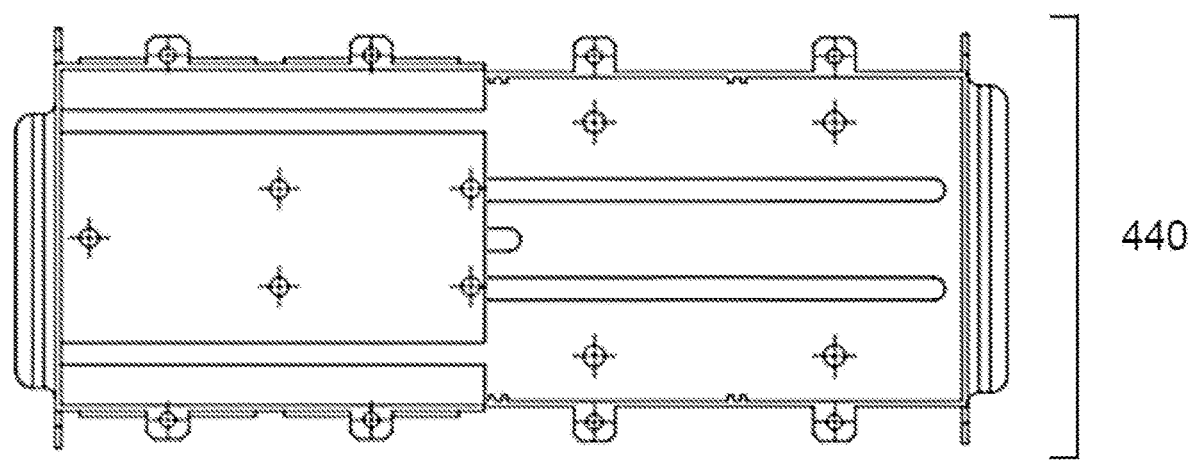

In another embodiment, as illustrated in FIGS. 10A-10C, the electrical box may be configured to receive two electrical components in the retracted position, and three or four electrical components in the extended position. As such, the extendable electrical box system may include varying extended positions. For example, the electrical box 410 as shown in FIGS. 10A-10C may include a first, semi-extended position 430 whereby the electrical box houses three electrical components and a second, fully extended position 440 whereby the electrical box houses four electrical components. As shown, the electrical box may begin with two electrical components in a retracted position 420. If the user wishes to add a third electrical component, they may extend the electrical box to a semi-extended position 430; and if the user then wishes to add a fourth electrical component, they may further extend the electrical box to a fully extended position 440.

It should be appreciated that the electrical box is not limited to a maximum of four electrical components in the extended position, nor is it limited to a maximum of two electrical components in the retracted position. It is contemplated that the electrical box may be extended to receive more than four electrical components in some embodiments and the retracted position may hold more than two electrical components in some embodiments. Preferably, the electrical component may include an outlet receptacle, an electrical switch, or a combination thereof. However, it should be appreciated that the electrical component is contemplated to include any type of electrical component configured for installation into a wall, floor, or roof.

Figure 6:
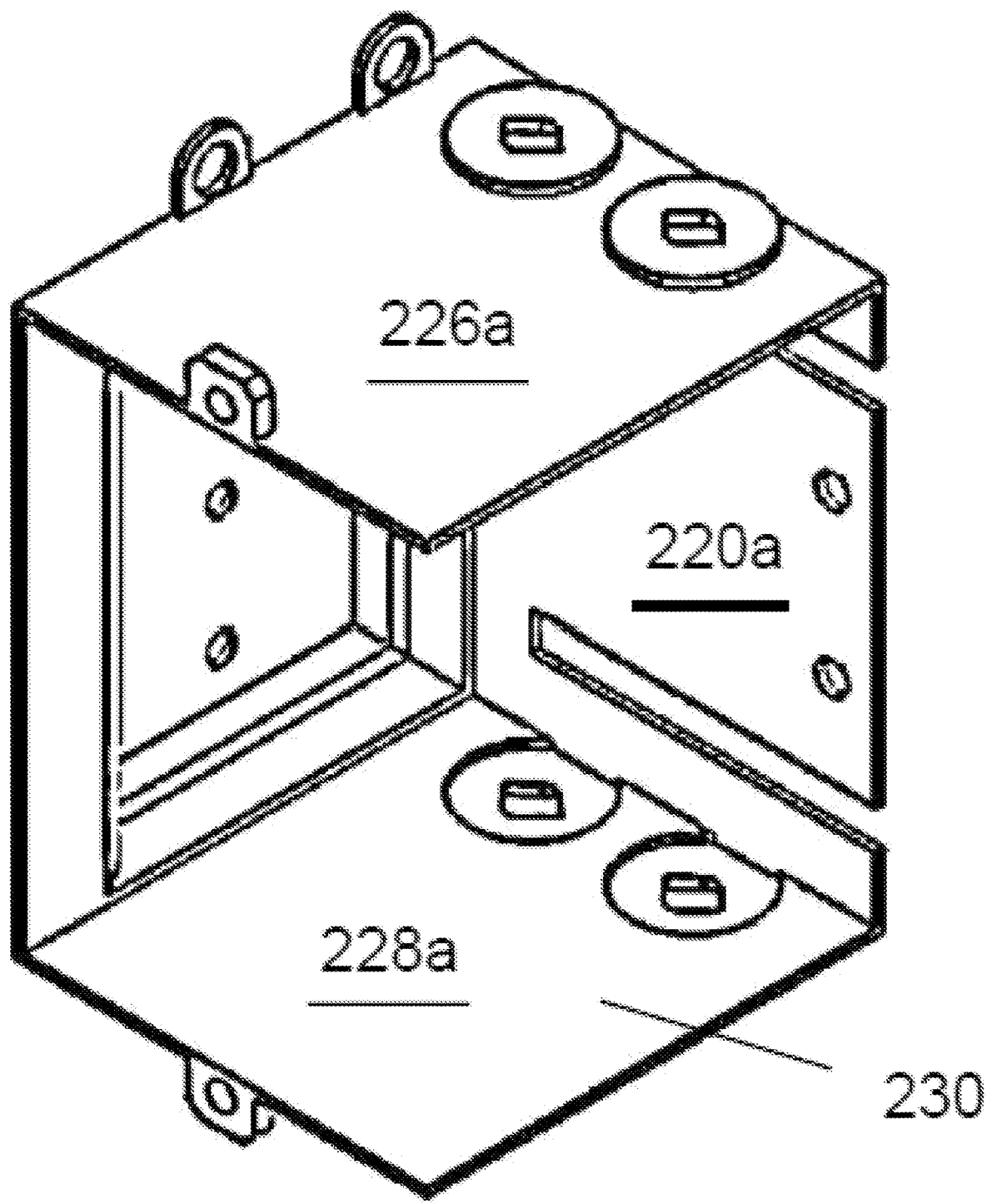
FIG. 6 is a perspective view of a first section of an extendable electrical box, according to another embodiment of the present invention.
Figure 7:
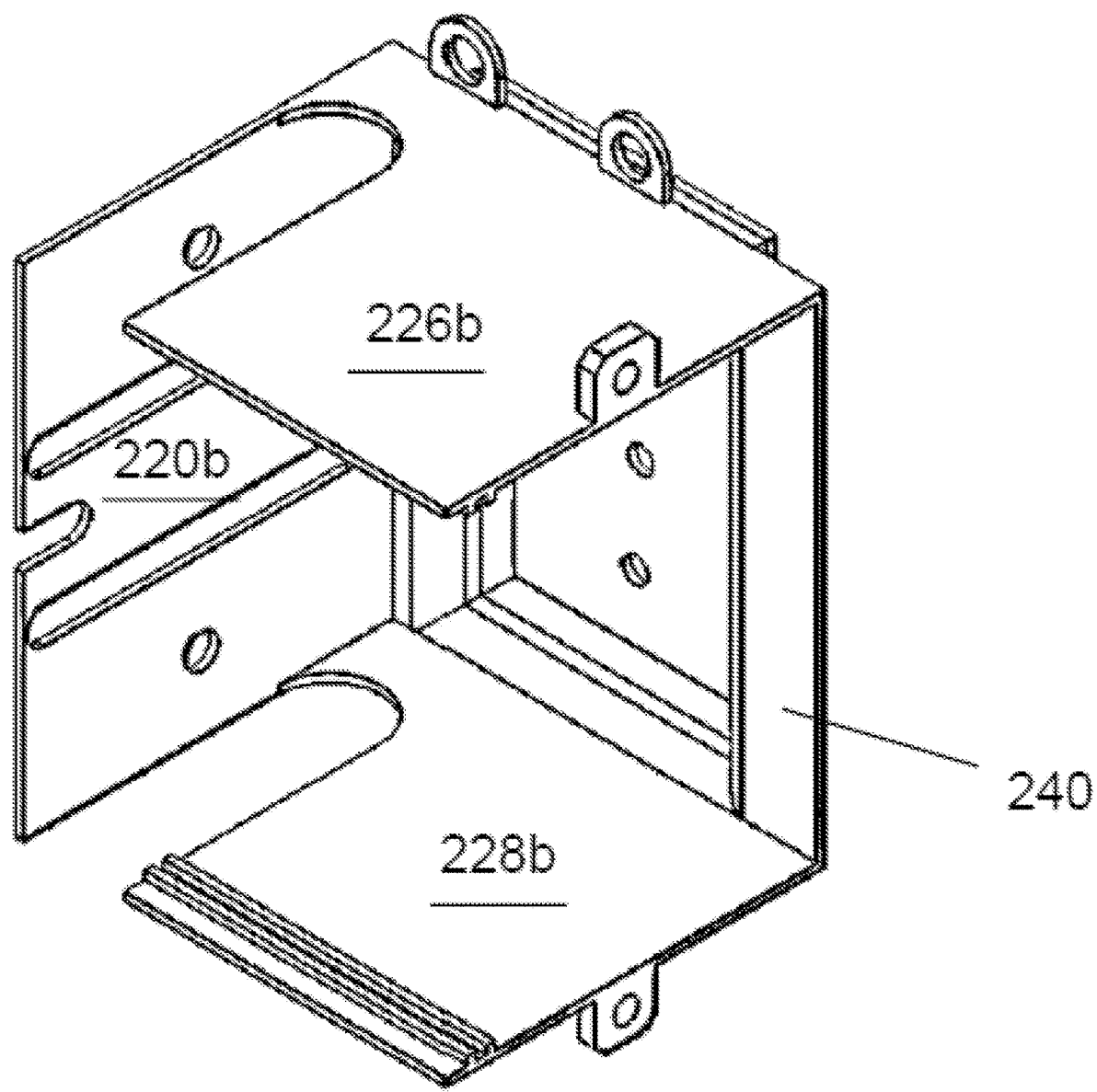
FIG. 7 is a perspective view of a second section an extendable electrical box, according to the embodiment of FIG. 6.

In some embodiments as shown in FIGS. 6-7, the first portion of the top-side wall may include a first half of the top-side wall 226a, the first portion of the bottom-side wall may include a first half of the bottom-side wall 228a, the first portion of the rear wall may include a first half of the rear wall 220a, the second portion of the top-side wall may include a second half of the top-side wall 226b, the second portion of the bottom-side wall may include a second half of the bottom-side wall 228b, and the second portion of the rear wall may include a second half of the rear wall 220b.

Figure 8:
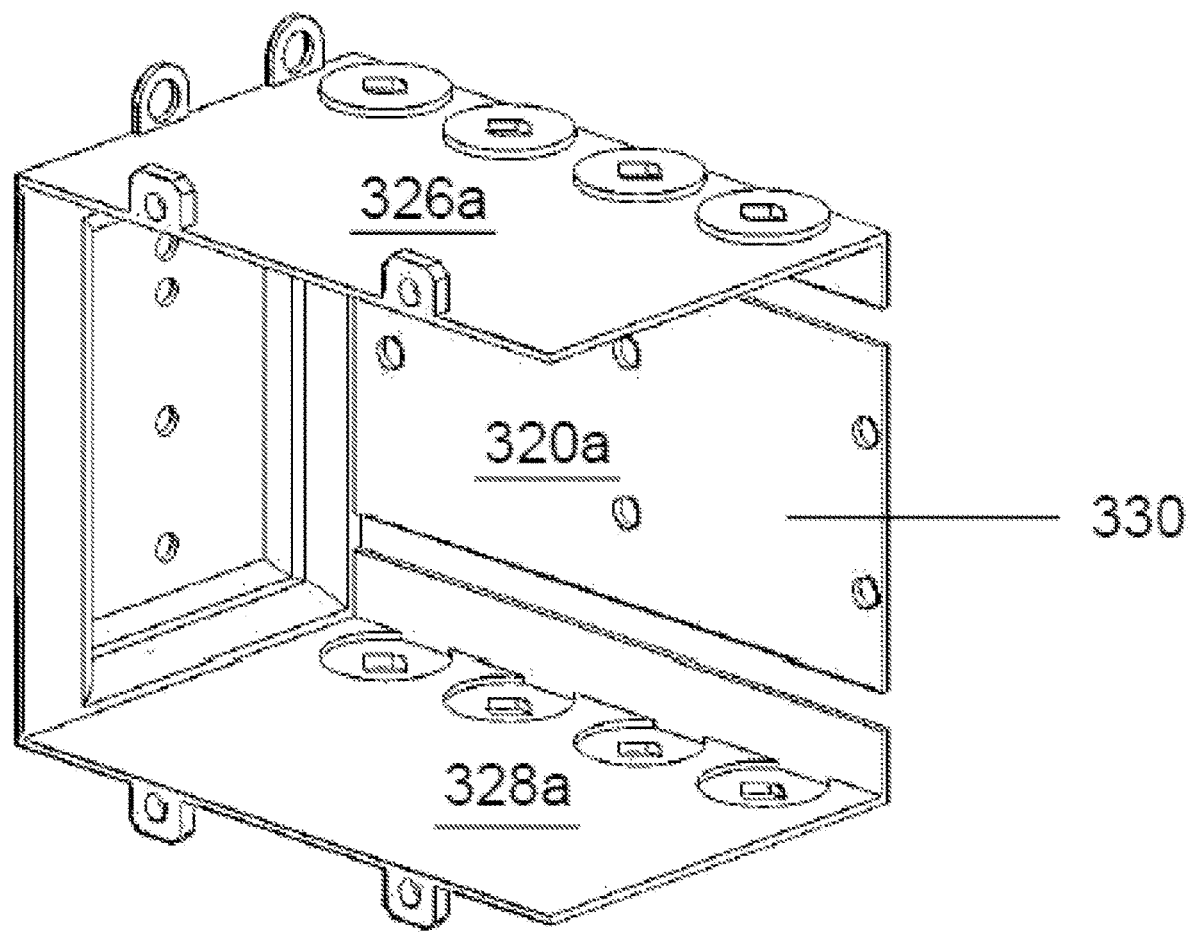
FIG. 8 is a perspective view of a first section of an extendable electrical box whereby the electrical box houses two electrical components in a retracted position and can house up to four electrical components in an extended position, according to another embodiment of the present invention.
Figure 9:
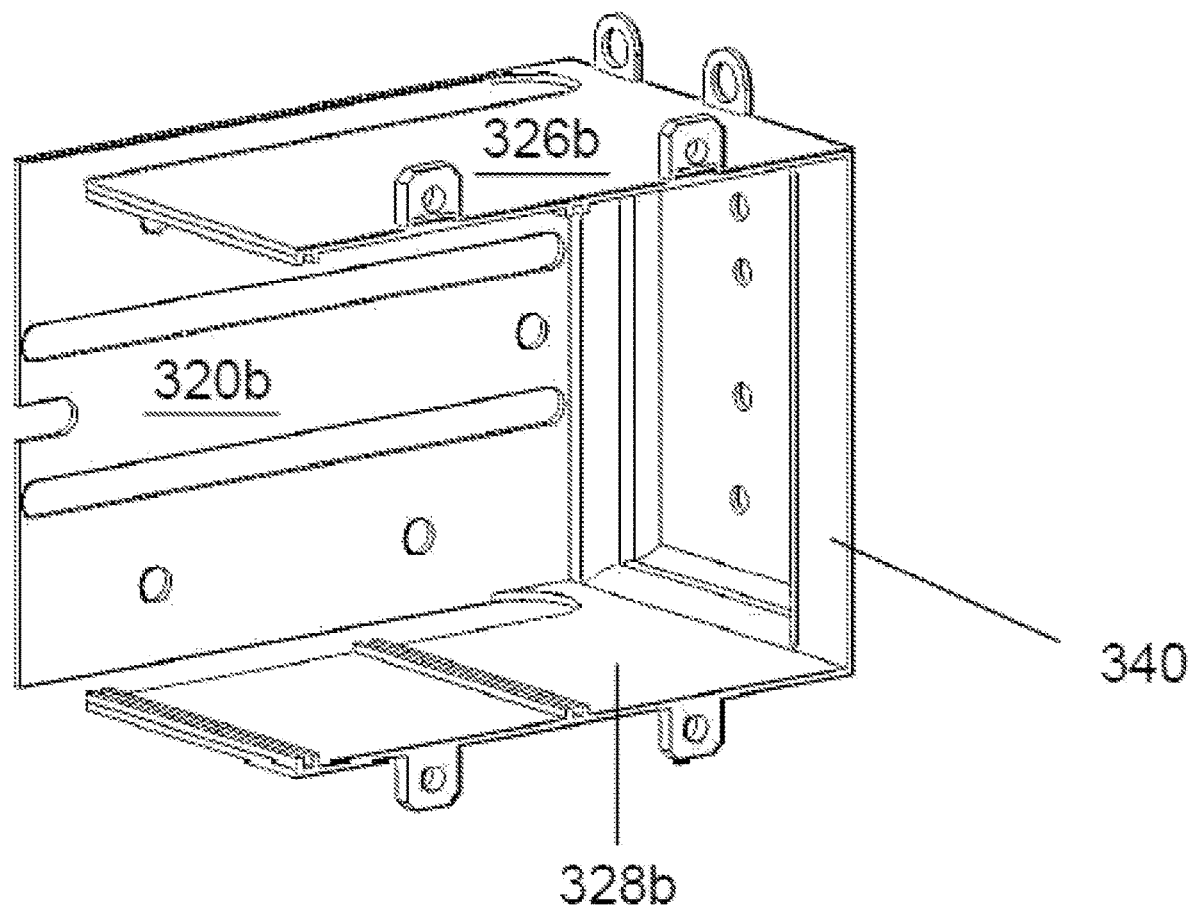
FIG. 9 is a perspective view of a second section an extendable electrical box, according to the embodiment of FIG. 9.

Similarly, in another embodiment having different dimensions as shown in FIGS. 8-9, the first portion of the top-side wall may include a first half of the top-side wall 326a, the first portion of the bottom-side wall may include a first half of the bottom-side wall 328a, the first portion of the rear wall may include a first half of the rear wall 320a, the second portion of the top-side wall may include a second half of the top-side wall 326b, the second portion of the bottom-side wall may include a second half of the bottom-side wall 328b, and the second portion of the rear wall may include a second half of the rear wall 320b. In this embodiment, the first section 330 and second section 340 may be combined to from an electrical box that can receive at least two electrical components in a retracted position, and at least four electrical components in a fully extended position.

In the embodiment as shown in FIGS. 6-9, the first section 230 and the second section 240 (and the first section 330 and second section 340) may be substantially equal in size and shape. As such, when the electrical box is in the extended position, the electrical box may be double the size it is when the electrical box is in the retracted position. For example, the retracted position may include the electrical box having a width of 2 inches, and the extended position may include the electrical box having a width of 4 inches. In the embodiment shown in FIGS. 6-7, the electrical box 210 may be sized to receive one electrical component in the retracted position, and two electrical components in the extended position. Alternatively, as shown in FIGS. 8-9 the electrical box may be sized to receive two electrical components in the retracted position, and four electrical components in a fully extended position (in some embodiments as shown in FIGS. 10A-10C, the electrical box may be extended to a semi-extended position to receive three electrical components).

In other embodiments not shown, the first section and the second section may be of different sizes. For example, the first section 330 of FIG. 8 may be sized to receive two electrical components, and combined the second section 240 of FIG. 8 which may be sized to receive one electrical component. In such a configuration, the electrical box may receive a total of three electrical components in the extended position and two electrical components in the retracted position.

Figure 4:
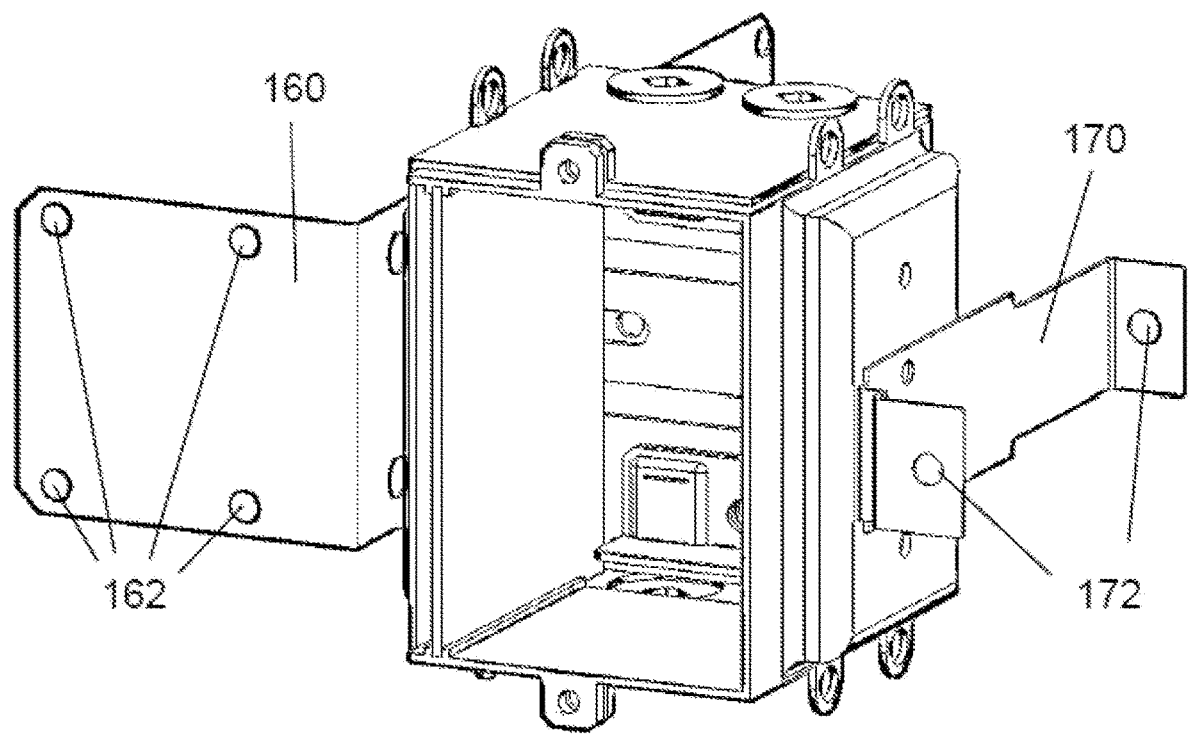
FIG. 4 is a front perspective view of an extendable electrical box system, illustrating a retracted position thereof, according to another embodiment of the present invention.

As above, the first section and the second section may be movable relative to each other to selectively move the electrical box from a retracted position to an extended position. Preferably, the second section may slide to and away from the first section. As shown in FIGS. 1 and 4, in the retracted position the second section may overlap the first section or vice versa. As shown in FIGS. 1 to 3, The first portion of the rear wall may include at least one track, e.g., a channel including an elongated aperture or an elongated groove 50, 60, 70 or 80, and the second portion of the rear wall 20 may include at least one protuberance 52, 62, 72 or 82 configured for mating with the at least one track.

As shown in FIG. 2, the at least one protuberance 52, 62, 72 or 82 may be configured to slide linearly about a horizontal plane of the at least one track 50, 60, 70 or 80, therefore placing the extendable electrical box system in the retracted position or the extended position. As shown in FIG. 2, the least one track may include two or more tracks distributed between the first section and second section (for example, tracks 60 and 70 found in the first section 30, and tracks 50 and 80 found in the second section 40), and the at least one protuberance may include two or more corresponding fasteners such as screws distributed between the first section and the second section (for example, screws 52 and 82 in first section 30, and screws 62 and 72 in second section 40). The screws may further be used to hold the housing in the retracted position or the extended position and prevent the second section from moving. In other embodiments, the extendable electrical box system may include a telescope whereby the second section is pulled from an interior of the first section to place the housing into the extended position. Other extension units are also contemplated.

Figure 5:
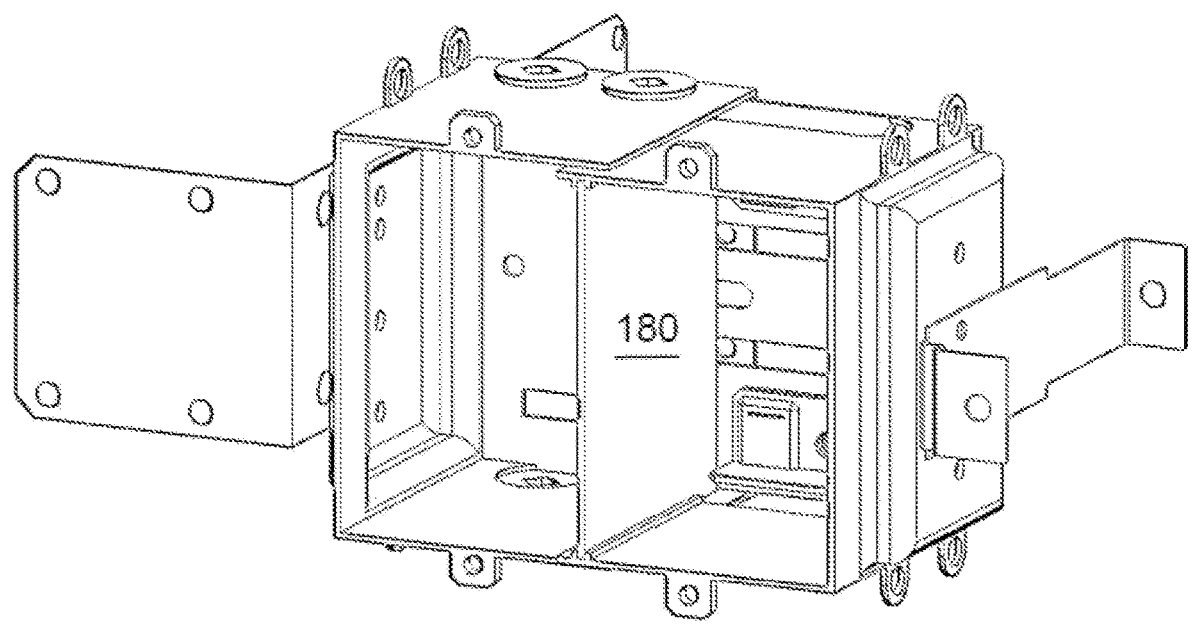
FIG. 5 is a front perspective view of an extendable electrical box system of FIG. 4, illustrating an extended position thereof whereby the electrical box houses two electrical components, according to an embodiment of the present invention.

As shown in FIGS. 4 and 5, other devices such as side brackets 160 and 170 having wall mounting device 162 and 172 may be used to further secure the electrical box to the wall at each of the retracted and extended positions. Additionally, a divider 180 may be used to create separate compartments within the housing in the extended position.

In use, a user may install the electrical box into the wall of the building and thread/feed the electrical wires therethrough for later connection to at least one electrical component. The user may selectively keep the electrical box in the retracted position and install one (or two in some embodiments) electrical components therein, connecting the electrical wires thereto. If the user then wants to add another electrical component, they may easily move the electrical box into the extended position and install another electrical component into the enclosure.

If the user decides to add an electrical component after installation of the first (or first and second) electrical component (whereby the wall is refinished), the user may simply remove a cover plate, easily cut the dry wall immediately adject to the electrical box, move the electrical box into the extended position, install the second (or third, fourth, etc.) electrical component and re-install the cover plate (preferably a new cover plate that covers all electrical components). Therefore, adding an electrical component to the electrical box is a quick and easy process with minimal damage to the wall. The exact specifications, materials used, and method of use of the extendable electrical box system may vary upon manufacturing.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

What is claimed is:

1. An electrical box for housing electrical components, the electrical box comprising:
    a first section and a second section, the first section and the second section movable relative to each other to selectively move the electrical box from a retracted position to an extended position,
    wherein, in the retracted position, the electrical box is sized to receive at least one electrical component,
    wherein, in the extended position, the electrical box is sized to receive more than one electrical component,
    wherein the first section further comprises a left-side wall, a first portion of a top-side wall, a first portion of a bottom-side wall, and a first portion of a rear wall,
    wherein the second section comprises a right-side wall, a second portion of the top-side wall, a second portion of the bottom-side wall, and a second portion of the rear wall,
    wherein at least one of the first portion of the rear wall and the second portion of the rear wall comprises at least one track,
    wherein at least one of the second portion of the rear wall and the first portion of the rear wall comprises at least one protuberance configured for mating with the at least one track.

2. The electrical box of claim 1,
    wherein the at least one track comprises a channel having one of an elongated aperture and an elongated groove.

3. The electrical box of claim 1,
    wherein the at least one protuberance slides linearly about a horizontal plane of the at least one track to selectively move the electrical box between the retracted position and the extended position.

4. The electrical box of claim 1,
    wherein the at least one track comprises two tracks,
    wherein the at least one protuberance comprises at least one fastener,
    wherein the fastener secures the electrical box in one of the retracted position and the extended position.

* * * * *